(12) United States Patent
Vuong

(10) Patent No.: US 8,369,505 B2
(45) Date of Patent: Feb. 5, 2013

(54) CALL ACCESS MANAGEMENT

(75) Inventor: Thanh Vinh Vuong, Kitchener (CA)

(73) Assignee: Research In Motion Limited, Waterloo (CA)

( * ) Notice: Subject to any disclaimer, the term of this patent is extended or adjusted under 35 U.S.C. 154(b) by 198 days.

(21) Appl. No.: 12/760,015

(22) Filed: Apr. 14, 2010

(65) Prior Publication Data

US 2011/0255680 A1   Oct. 20, 2011

(51) Int. Cl.
*H04M 3/42* (2006.01)
(52) U.S. Cl. ......... 379/201.01; 379/201.07; 379/201.08; 379/211.01; 379/211.02
(58) Field of Classification Search ............. 379/201.01, 379/201.07, 201.08, 211.01, 211.02
See application file for complete search history.

(56) References Cited

U.S. PATENT DOCUMENTS

| 7,359,496 B2 | 4/2008 | Qian et al. |
| 7,443,971 B2 | 10/2008 | Bear et al. |
| 2002/0085701 A1* | 7/2002 | Parsons et al. ........... 379/211.01 |
| 2005/0141687 A1 | 6/2005 | Ozugur |
| 2005/0195954 A1* | 9/2005 | Klein et al. .............. 379/201.04 |
| 2006/0288099 A1 | 12/2006 | Jefferson et al. |
| 2007/0033256 A1 | 2/2007 | Ben-Itzhak |
| 2008/0254776 A1 | 10/2008 | Ma |
| 2009/0150441 A1 | 6/2009 | Johnson et al. |
| 2009/0168977 A1 | 7/2009 | Galvin |
| 2009/0323920 A1* | 12/2009 | Bender et al. ............ 379/220.01 |
| 2010/0091969 A1* | 4/2010 | Joy et al. ................. 379/207.03 |

OTHER PUBLICATIONS

European Search Report dated Aug. 26, 2010. In corresponding application No. 10159950.4.

* cited by examiner

*Primary Examiner* — Quynh Nguyen
(74) *Attorney, Agent, or Firm* — Novak Druce + Quigg LLP

(57) ABSTRACT

Receiving a request from a device for an incoming call to a called number. Obtaining presence information of the called party. Presenting the obtained information via the calling device. Presenting action option(s) including an option to proceed with the call. Receiving an action choice corresponding to proceed with the call. Presenting a request for credentials to the calling party. Receiving credentials corresponding to a calling party permitted to continue with the call. Proceeding with the call.

15 Claims, 6 Drawing Sheets

CALL ACCESS MANAGEMENT

FIELD OF THE TECHNOLOGY

The technology disclosed herein (the "technology") relates to call access management.

BRIEF DESCRIPTION OF THE DRAWINGS

Reference will now be made, by way of example, to the accompanying drawings which show example implementations of the present application, and in which.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

The present application relates to the control and management of communications. Although reference may be made to "calls" in the description of example implementations below, it will be appreciated that the described systems and methods are applicable to session-based communications in general and not limited to voice calls. It will also be appreciated that the systems and methods may not be limited to sessions and may be applicable to messaging-based communications in some implementations.

Figure 1:
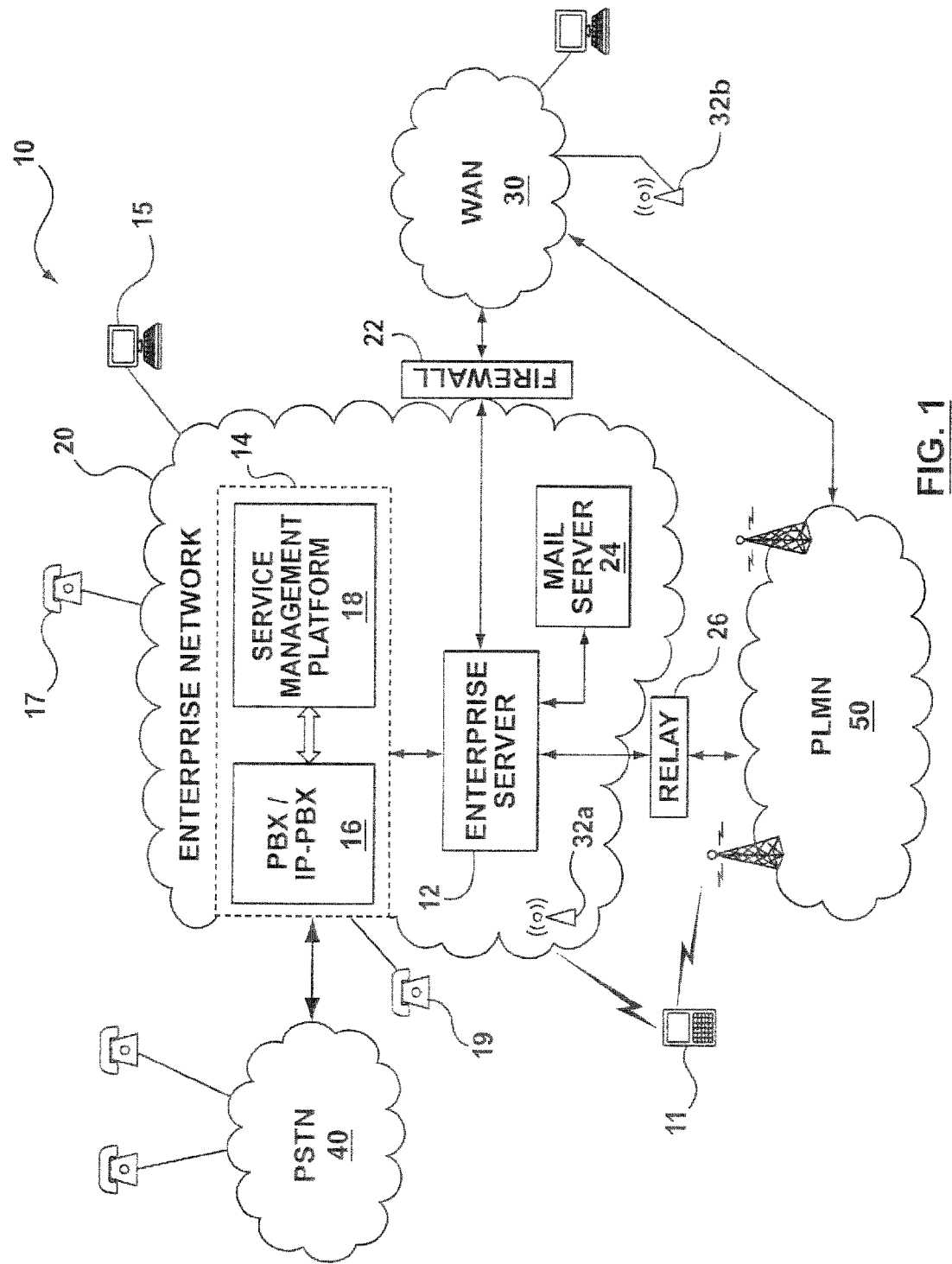
FIG. 1 shows, in block diagram form, an example system for managing enterprise-related mobile calls, including an enterprise communications platform.
Figure 2:
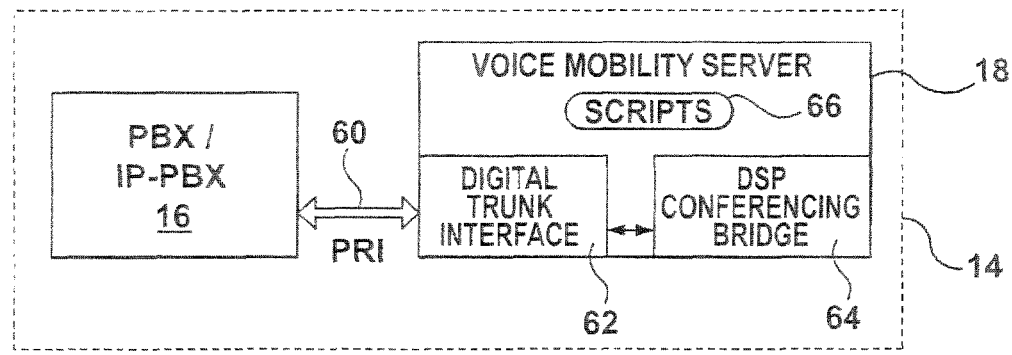
FIG. 2 shows, in block diagram form, further details of an implementation of the enterprise communications platform.

Reference is now made to FIG. 1, which shows, in block diagram form, an example system, generally designated 10, for the control and management of communications. The system 10 includes an enterprise or business system 20, which in many implementations includes a local area network (LAN). In the description below, the enterprise or business system 20 may be referred to as an enterprise network 20. It will be appreciated that the enterprise network 20 may include more than one network and may be located in multiple geographic areas in some implementations.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various implementations, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some implementations. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some implementations, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various implementations the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some implementations, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some implementations, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many implementations, Session Initiation Protocol (SIP) may be used to set-up, manage, and terminate media sessions for voice calls.

Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

In this implementation, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

Figure 3:
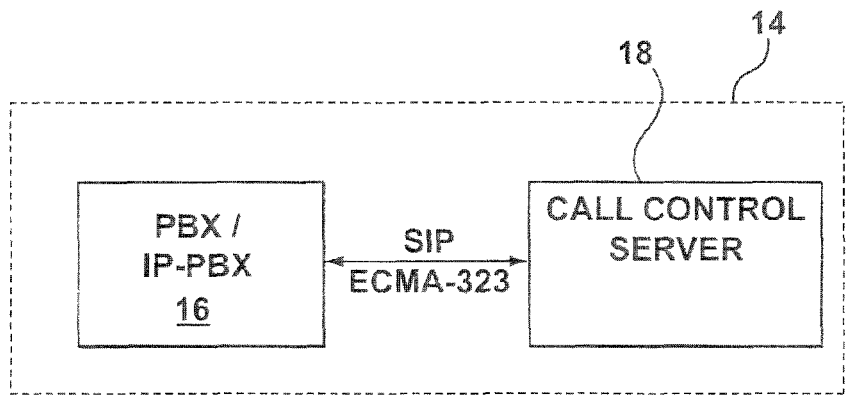
FIG. 3 shows another implementation of the enterprise communications platform.

FIG. 3 shows another implementation in which the PBX 16 performs the functions of terminating and/or bridging media streams, but call control functions are largely handled by the SMP 18. In this implementation, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one implementation, communications between the PBX 16 and the call control server 18 are carried out in accordance with SIP. In other words, the call control server 18 uses SIP-based communications to manage the set up, tear down, and control of media handled by the PBX 16. In one example implementation, the call control server 18 may employ a communications protocol conforming to the ECMA-269 or ECMA-323 standards for Computer Supported Telecommunications Applications (CSTA).

Figure 4:
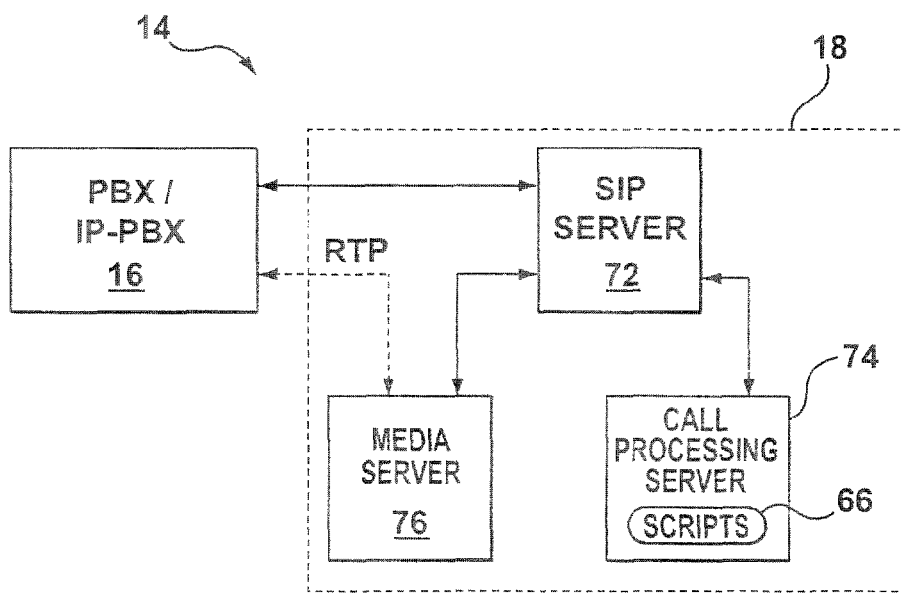
FIG. 4 shows yet another implementation of the enterprise communications platform.

FIG. 4 shows yet another implementation of the enterprise communications system 14. This implementation reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
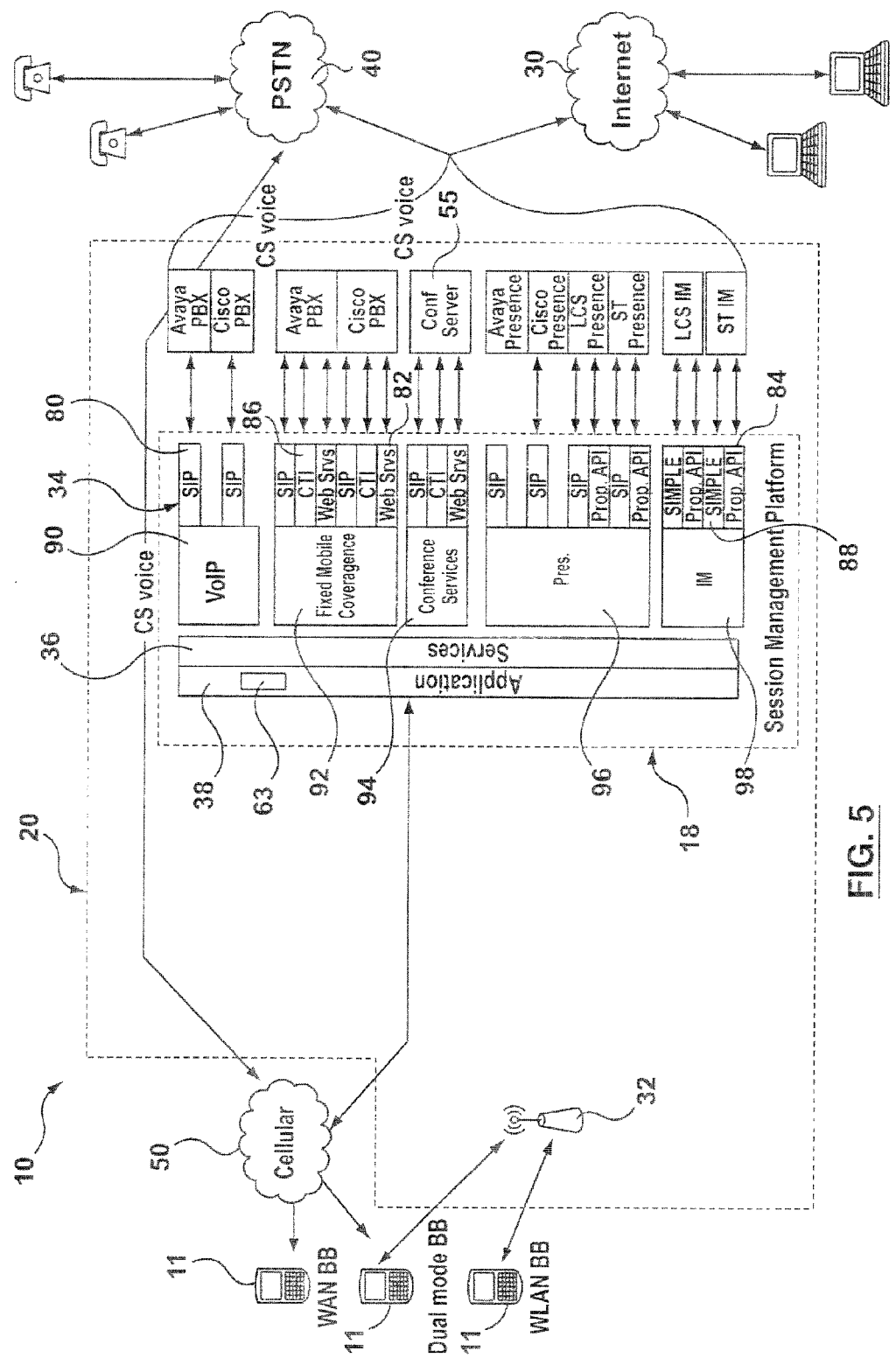
FIG. 5 shows further details of the enterprise communications platform of FIG. 3.

Reference is now made to FIG. 5, which shows another implementation of the enterprise communications system 14 with a Third Party Call Control architecture. In this implementation, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 is configured for directing media and data streams to and from one or more communication devices (i.e., mobile devices 11, telephones 17, and computers 15).

In a common scenario, a mobile device user desires not to be contacted via one or more modes of contact (e.g., voice, SMS) under certain circumstances (e.g., circumstances settable by the user, circumstances determinable by a presence server). For example, a user may desire not to be disturbed by a phone call when in meeting. Another user may desire to receive calls while driving only with the mobile device in hands-free mode. Incoming calls can disturb a called party, e.g., when the called party is busy: e.g., a caller dials a colleague's mobile telephone number while the colleague is in a meeting; e.g., a caller dials a spouse at home while the spouse is napping with their child. From the calling party's perspective, a calling party may not wish to ring a spouse's phone during a child's nap.

Implementations of the present technology can be useful to both the calling party and the called party. In some implementations, the calling party receives an indication of called party status and called party wishes. The displayed status and wishes can be a function of presence, where the relationship between presence and the displayed status and wishes can be defined by a profile of the called party. The calling party can be prompted for a choice whether or not to proceed, and can be prompted for credentials before being allowed to proceed. Credentials can be, e.g., repeating keys "4321", or some number the calling device prompts the user to input, or a secure password that only certain individuals are given. If credentials are supplied correctly, then the call is allowed to proceed. If credentials are supplied incorrectly, then the call can be directed to voice mail, or terminated.

For example, if a called party is in a meeting from 2:00 p.m.-4:00 p.m. with called party's boss. This meeting is on called party's calendar. Called party chooses to share this information (both busy status during that time and the title of the meeting) with others. Calling party calls called party at 3:00 and receives the following prompt: "<called party="123-456-7890"> is currently <status="in a meeting"> from <start time="2:00 p.m."> to <stop time="4:00 p.m">. Press #1 to proceed with the call; #2 to proceed to voice mail; #3 to hang up." If the calling party presses #1, the calling party is prompted for credentials. Upon receipt of the proper credentials, the call is allowed to proceed.

Implementations of the technology employ availability information of a called party and access control when managing communications between a calling device of a calling party and called device of the called party. Typically, when a calling party dials a telephone number from a calling device, the call is placed without regard to the availability of the called party. If the called device is in use, a busy signal may be returned to the calling device, or the called party may be notified of an incoming call with a tone or message. If the called device goes unanswered for a number of rings, then it is typical for a voicemail service to be connected so that an announcement may be presented to the calling party and the calling party may leave a message. If the called device is not in use and the calling device is not blocked, the called device rings. As described above, this can be counter to the called party's wishes.

Figure 6A:
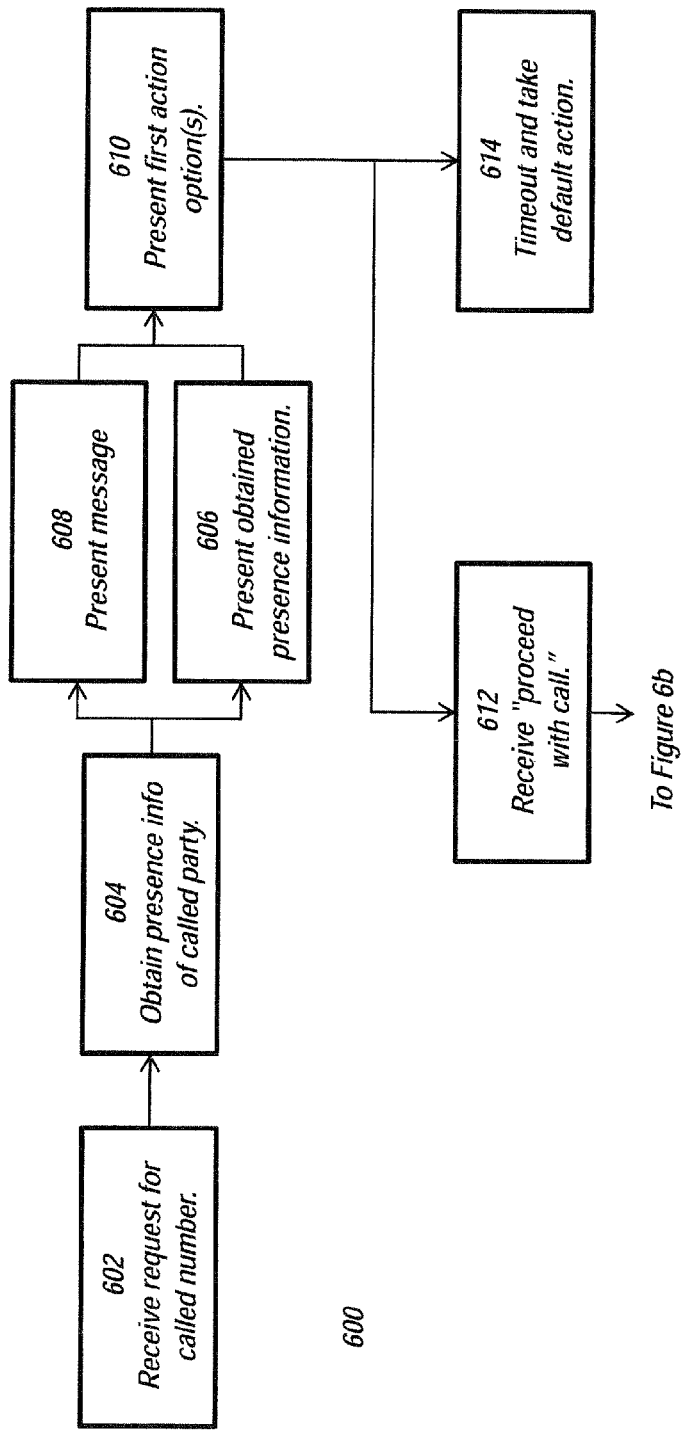
FIG. 6a and FIG. 6b illustrate methods of the technology.

Referring to FIG. 6a, exemplary methods 600 of the technology are illustrated in the context of a system 10 of FIG. 1. In such methods, a third-party call control service management platform (SMP) 18 can receive a request 602 for an incoming call to a called number within the control of the SMP 18. The SMP 18 can obtain presence information of a party associated with the called number 604 (the "called party"). For example, the SMP 18 can obtain presence information from a mail server 24 that maintains a calendar of the called party, or the SMP 18 can obtain presence information from a presence server (not shown) of the system 10.

The SMP 18 can present the presence information to the calling party 606, e.g., via the calling device 11. For example, upon dialing a called number presently in use, the technology can prompt the calling device 11, with an "unavailable" status message of the called party obtained from a presence server shared by the calling device and the called device, such as "<called party> is in a meeting right now." Further, the SMP 18 can present a message 608 from the called party, e.g., regarding circumstances under which the called party is open to communication, e.g., "emergency calls only," "accepting SMS messages only." Such messages can be accepted from the called party by the system 10 prior to receiving a call request, they also can be based on a profile that identifies appropriate messages based on obtained presence information.

The SMP 18 can also present one or more first action options 610 via the calling device, including at least, e.g., "proceed with the call in light of <called party>'s status." As a further example, where the called device profile reflects presence information indicating that the user associated with the called device is in a meeting from 2:00 p.m.-3:00 p.m. and a call is initiated to the called device at 1:30 p.m., the system can respond with the following text displayed at the calling device 11a: <called device 11b user name> is in a meeting between 2:00 p.m. and 3:00 p.m. Press "1" to ring <called device 11b user name>'s phone; Press "2" to leave a voice message for <called device 11b user name>; Press "3" to send an SMS to <called device 11b user name>; Press "4" to terminate the call. Each of the status of the called user, and the option to proceed, can be provided to the calling device 11 via text or voice.

The SMP 18 can receive an action choice 612 from among those action options presented via the calling device 11. If at least one valid action choice is not received after a period of time, then the SMP 18 can timeout with regard to action choices and take a preselected default action 614, e.g., cancel the call (though such preselected default actions are not limit to the action options presented to the calling device).

In an example, upon receipt of an action choice the SMP 18 either 1) proceeds with the call, e.g., the system received input that the calling party wishes to proceed even given the status of the called party; 2) routes the call to voice mail, e.g., the SMP 18 received input that the calling party wished to continue to voice mail; 3) accepts an SMS message; or 4) terminates the call, i.e., the SMP 18 received input that the calling party wishes to terminate the call. Other responses to other received inputs are possible, such as prompting for/accepting a page number. Such inputs can be voice, text, or other inputs known to those of skill in the art.

Figure 6B:
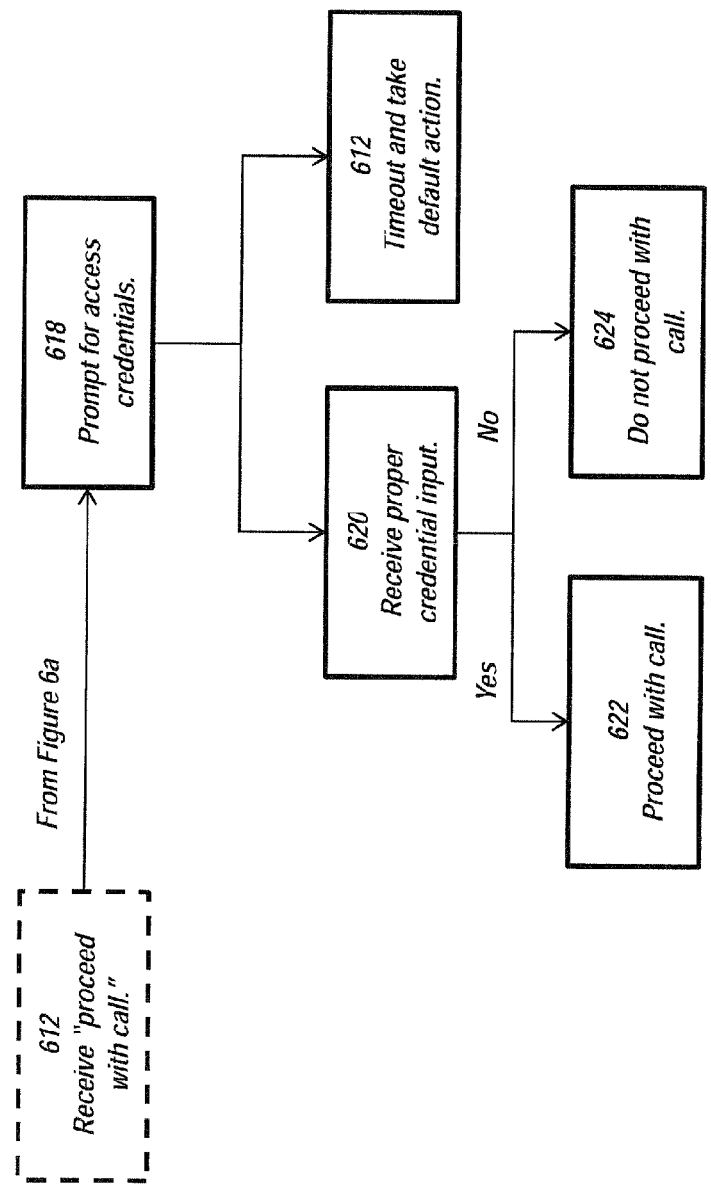

Referring to FIG. 6b, if the SMP 18 receives the action choice "proceed with the call in light of <called party>'s status" (or similar action choice) 616, then the SMP 18 can present a request for credentials 618 to the calling party via the calling device (e.g., "please input credentials in order to proceed with the call.") The SMP can receive credentials input 620. If credentials input is not received after a period of time, then the SMP 18 can timeout with regard to action choices and take a preselected default action 614, e.g., cancel the call (though such preselected default actions are not limit to the action options presented to the calling device).

If the SMP 18 receives proper credentials input corresponding to a calling party permitted to continue with the call, then the call proceeds 622 according to the protocol of the system 10. Credentials can be of the form of a pass code, a password, voice recognition, a calling device identifier, Automatic Number Identification (ANI), Caller Identification (Caller ID), and various combinations thereof. As examples, pass code and voice recognition can be required, voice recognition can be used in conjunction with a calling device identifier. In the case of using a device identifier as credentials, the step of presenting a request for credentials can be omitted and credentials can be obtained from the calling device itself. If the SMP 18 receives improper credentials, the technology does not proceed with the call 624, and handles the call request according to its protocol for improper credentials.

Implementations of the technology can employ profiles for controlling incoming call access to the device 11. Profile contents can be compatible with Request For Comments (RFC) 4480 (Rich Presence Extensions to the Presence Information Data Format (RPID)), RFC 4481, RFC 4482 (Contact Information for the Presence Information Data Format) with fields to support features of the present technology, e.g., limitations on the mode of the communication (e.g., no text, hands-free answer only), positive/negative access lists, and access criteria (e.g., as described below). Positive access lists identify those callers and calling devices, including groups of callers and groups of calling devices, which can complete a call to the device 11 upon satisfaction of other access criteria (including open access). Such lists are variously referred to as "white lists." Negative access lists identify those callers and calling devices, including groups of callers and calling devices, which are not allowed an opportunity to present other access criteria. Such lists are variously referred to as "black lists" and "banned caller" lists.

Figure 7:
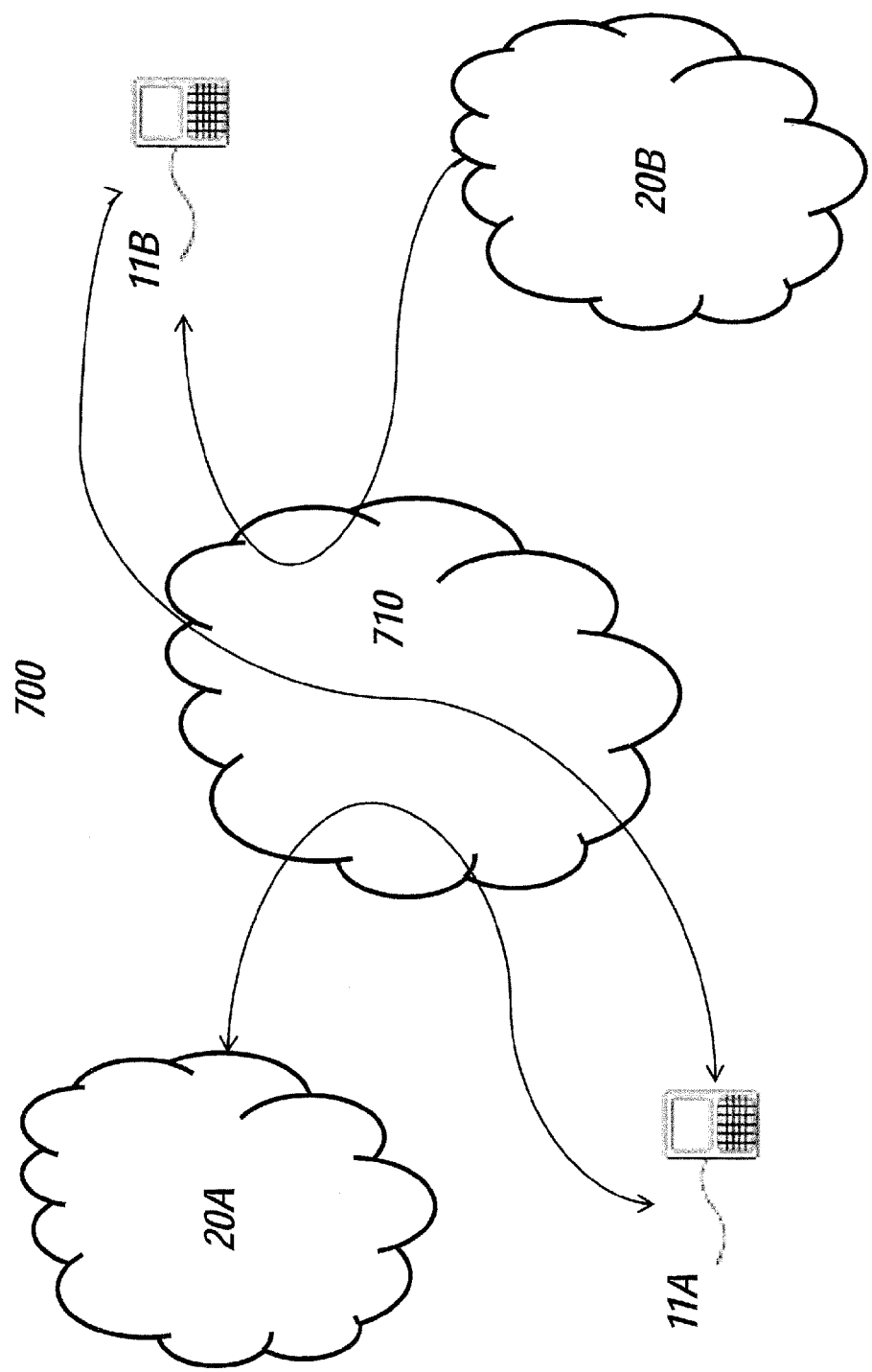
FIG. 7 illustrates an architecture of the technology.

While FIG. 6 and its corresponding description herein disclose an SMP 18 capable of performing much of the exemplary method, other elements of the system 10, or other systems, in communication with elements having access to the described data can be used. For example, as shown in FIG. 7, the calling device 11A and the called device 11B can serve as proxies for access to the data elements in enterprise network 20A of the calling device 11A and data elements in the system of the enterprise network 20B of the called device 11B. Such an approach can be used to transfer a portion of the processing demand to the devices and allow the devices to serve as an abstraction mechanism, facilitating, e.g., standardization of messages between devices with less regard for the system specific syntax requirements of the respective systems of the devices.

The present technology can take the forms of hardware, software or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A system for managing packet-switched calls, the system comprising:
at least one processor,
at least one computer readable medium in communication with the processor;
at least one program module, stored on the at least one medium, and operable for, upon execution by the at least one processor:
receiving a request from a calling device associated with a calling party for an incoming call to a called number;
obtaining presence information of a called party associated with the called number;
presenting the obtained presence information to the calling party via the calling device;
presenting a message associated with the called party, the message providing called party criteria for receiving incoming calls;
presenting at least one first action option via the calling device, including at least an option to proceed with the incoming call;
receiving an action selection corresponding to the at least one first action option to proceed with the requested incoming call;
in response to receiving the action selection to proceed with the requested incoming call:
presenting a request for credentials to the calling party via the calling device, the credentials comprising at least one of a pass code, a password, and voice recognition;
identifying credentials of a calling party permitted to continue with the incoming call; and
proceeding with the incoming call for the calling party permitted to continue.

2. The system of claim 1 wherein:
obtaining the presence information comprises obtaining the presence information from a mail server that maintains a calendar of the called party.

3. The system of claim 1 wherein:
obtaining the presence information comprises obtaining the presence information from a presence server.

4. The system of claim 1 wherein:
the message is based on a profile that identifies appropriate messages as a function of the obtained presence information.

5. The system of claim 1 wherein:
the at least one first action option further comprises at least one of: routing the incoming call to voice mail, sending a Short Message Service (SMS) message, and terminating the request.

6. A computer-implemented method for managing packet-switched calls, the method comprising:
receiving a request from a calling device associated with a calling party for an incoming call to a called number;
obtaining presence information of a called party associated with the called number;
presenting the obtained presence information to the calling party via the calling device;
presenting a message associated with the called party, the message providing called party criteria for receiving incoming calls;
presenting at least one first action option via the calling device, including at least an option to proceed with the incoming call;
receiving an action selection corresponding to the at least one first action option to proceed with the requested incoming call;
in response to receiving the action selection to proceed with the requested incoming call:
presenting a request for credentials to the calling party via the calling device, the credentials comprising at least one of a pass code, a password, and voice recognition;

identifying credentials of a calling party permitted to continue with the incoming call; and proceeding with the incoming call for the calling party permitted to continue.

7. The computer-implemented method of claim 6 wherein:
obtaining presence information comprises obtaining the presence information from a mail server that maintains a calendar of the called party.

8. The computer-implemented method of claim 6 wherein:
obtaining presence information comprises obtaining the presence information from a presence server.

9. The computer-implemented method of claim 6 wherein:
the message is based on a profile that identifies appropriate messages as a function of the obtained presence information.

10. The computer-implemented method of claim 6 wherein:
the at least one first action option further comprises at least one of: routing the incoming call to voice mail, sending a Short Message Service (SMS) message, and terminating the request.

11. A non-transitory computer readable medium storing instructions for managing packet-switched calls upon execution by at least one processor for:

receiving a request from a calling device associated with a calling party for an incoming call to a called number;

obtaining presence information of a party associated with the called number(i.e., the "called party");

presenting the obtained presence information to the calling party via the calling device;

presenting at least one first action option via the calling device, including at least an option to proceed with the call;

presenting a message associated with the called party, the message providing called party criteria for receiving incoming calls;

receiving an action selection corresponding to the at least one first action option to proceed with the requested incoming call;

in response to receiving the action selection to proceed with the requested incoming call:

presenting a request for credentials to the calling party via the calling device, the credentials comprising at least one of a pass code, a password, and voice recognition;

identifying credentials of a calling party permitted to continue with the incoming call; and proceeding with the incoming call for the calling party permitted to continue.

12. The non-transitory computer readable medium of claim 11 wherein:
obtaining presence information comprises obtaining the presence information from a mail server that maintains a calendar of the called party.

13. The non-transitory computer readable medium of claim 11 wherein:
obtaining presence information comprises obtaining the presence information from a presence server.

14. The non-transitory computer readable medium of claim 11 wherein:
the message is based on a profile that identifies appropriate messages as a function of the obtained presence information.

15. The non-transitory computer readable medium of claim 11 wherein:
the at least one first action option further comprises at least one of: routing the incoming call to voice mail, sending a Short Message Service (SMS) message, and terminating the request.

\* \* \* \* \*